United States Patent [19]
Raphael et al.

[11] Patent Number: 5,899,948
[45] Date of Patent: May 4, 1999

[54] SYSTEM AND METHOD FOR THE DETECTION AND DISCRIMINATION OF VEHICLE CRASH EVENTS

[76] Inventors: Eric Lewis Raphael, Plymouth; Douglas Allan McConnell, Rochester Hills; Roy Joseph Scott, Dearborn; Canice Patrick Boran, Livonia; Jeffrey Donald Gleacher, Canton, all of Mich.

[21] Appl. No.: 08/795,745

[22] Filed: Feb. 6, 1997

[51] Int. Cl.⁶ .................................................. B60R 21/32
[52] U.S. Cl. ............................... 701/45; 701/46; 701/47; 280/735; 180/282
[58] Field of Search ................................ 701/45, 46, 47; 180/282; 280/735; 340/436

[56] References Cited

U.S. PATENT DOCUMENTS

| | | | |
|---|---|---|---|
| 4,994,972 | 2/1991 | Diller | 364/424.05 |
| 5,040,118 | 8/1991 | Diller | 364/424.05 |
| 5,157,268 | 10/1992 | Spies et al. | 307/10 |
| 5,216,607 | 6/1993 | Diller et al. | 364/424.05 |
| 5,337,238 | 8/1994 | Gioutsos et al. | 364/424.05 |
| 5,363,302 | 11/1994 | Allen et al. | 364/424.05 |
| 5,394,326 | 2/1995 | Liu | 364/424.05 |
| 5,483,449 | 1/1996 | Caruso et al. | 364/424.05 |
| 5,490,067 | 2/1996 | Teguri et al. | 364/424.05 |
| 5,498,028 | 3/1996 | Carlin et al. | 280/735 |
| 5,508,918 | 4/1996 | Gioutsos | 364/424.05 |
| 5,519,961 | 5/1996 | Giotsos et al. | 364/424.05 |
| 5,521,822 | 5/1996 | Wang | 364/424.05 |
| 5,702,124 | 12/1997 | Foo et al. | 280/735 |

*Primary Examiner*—Tan Q. Nguyen

[57] ABSTRACT

A system and method for controlling deployment of an inflatable passenger restraint utilize distance-based thresholds to improve deployment time in high-speed crash events and to improve event discrimination for side impacts. The invention uses an acceleration signal to calculate distance and to calculate average acceleration using three buffers holding differing numbers of samples. The three average accelerations are used to determine the length of the acceleration curves above and below the zero axis which is defined as positive and negative jerk. Average acceleration and jerk are compared to the distance-based thresholds to determine whether or not to deploy the inflatable restraint.

10 Claims, 3 Drawing Sheets

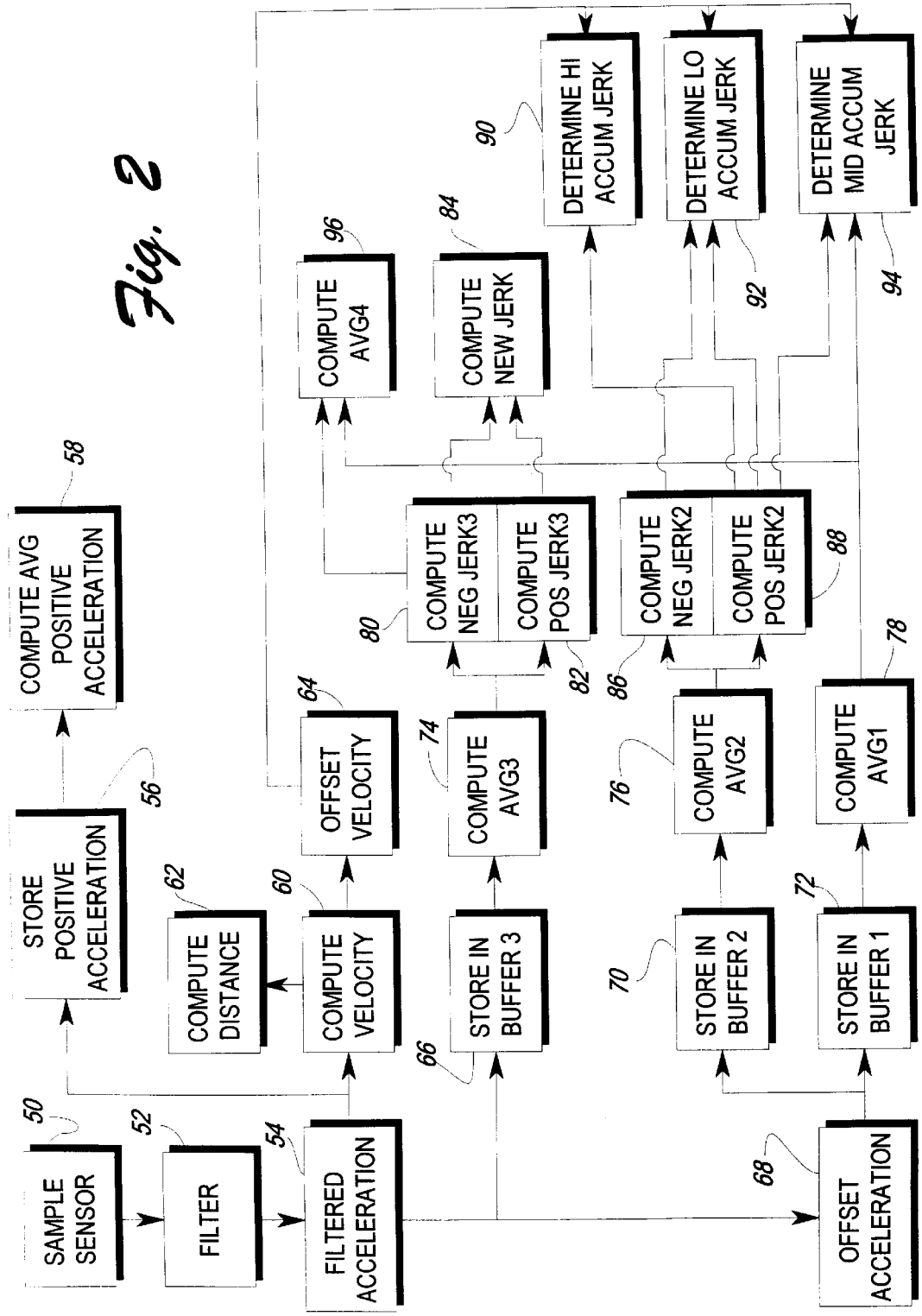

SYSTEM AND METHOD FOR THE DETECTION AND DISCRIMINATION OF VEHICLE CRASH EVENTS

TECHNICAL FIELD

The present invention relates to systems and methods for detecting a crash event and determining whether to deploy an inflatable passenger restraint.

BACKGROUND ART

A number of systems and methods for actuating vehicular safety devices are well known in the art. Typically, a sensor is used to determine vehicle acceleration (and therefore deceleration). The signal is processed to determine when to activate various passive safety devices, such as inflatable restraints and safety belt pre-tensioners.

To provide optimum protection for the passengers of the vehicle, it is important to accurately and expeditiously determine the relative severity of a crash event to allow sufficient time for the deployment of an inflatable restraint. It is also important to refrain from deploying an inflatable restraint for crash events in which the restraint would not benefit the passengers. Such events may include low-velocity impacts, side impacts, and the like.

DISCLOSURE OF THE INVENTION

It is thus a general object of the present invention to provide a method and system for accurately detecting a crash event and determining whether to deploy an inflatable passenger restraint which provides improved discrimination in side impacts and faster deploy decisions in high speed crash events.

In carrying out the above object and other objects, features and advantages of the present invention, a method for controlling deployment of an inflatable restraint disposed within a passenger compartment of a vehicle is provided. The method includes monitoring a signal indicative of acceleration of the passenger compartment to generate a plurality of signal samples, determining distance traveled by the passenger compartment based on the plurality of signal samples, determining a first average acceleration of the passenger compartment based on a first number of the plurality of signal samples, and determining jerk based on the first average acceleration. The method also includes determining a second average acceleration based on a second number of the plurality of signal samples and the jerk, comparing the jerk of the second average acceleration to a plurality of thresholds each based on the distance traveled, and generating a signal to deploy the inflatable restraint based on the second average exceeding at least one of the plurality of thresholds.

A system is also provided for controlling deployment of an inflatable restraint.

The advantages associated with the present invention are numerous. For example, the present invention uses distance-based thresholds rather than decision criteria based solely on elapsed time to arrive at a deployment decision about 20% faster than the previously employed system and method. The present invention provides improved side-impact discrimination by modifying the distance-based thresholds in response to a velocity (with offset) exceeding a predetermined threshold.

The above object and other objects, features, and advantages of the present invention, will be readily apparent from the following detailed description of the best mode for carrying out the invention when taken in connection with the accompanying drawings.

BRIEF DESCRIPTION OF THE DRAWINGS

FIGS. 2 and 3 are flow diagrams illustrating control logic for a system or method of controlling deployment of an inflatable restraint according to the present invention.

BEST MODE FOR CARRYING OUT THE PREFERRED EMBODIMENT

Figure 1:
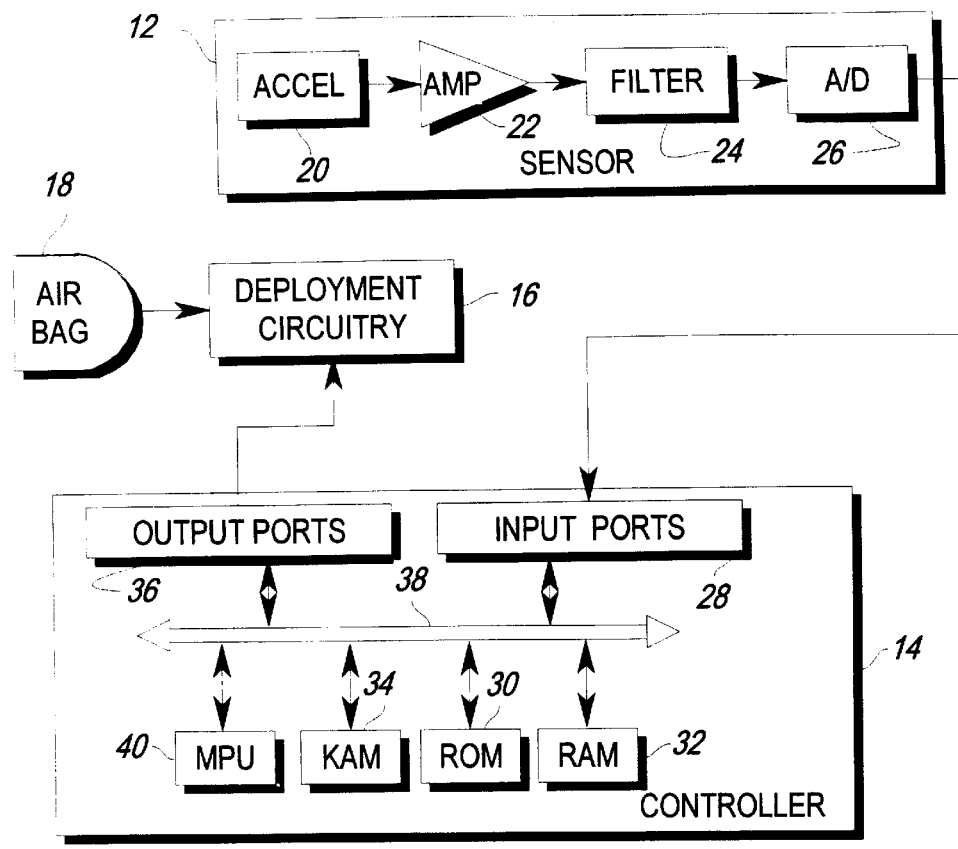
FIG. 1 is a block diagram of a system for controlling deployment of an inflatable restraint according to the present invention.

Referring now to FIG. 1, a system for actuating a passive restraint device disposed within a passenger compartment of a vehicle is shown. System 10 includes a sensor 12 which produces a signal indicative of acceleration of the passenger compartment. Preferably, sensor 12 is disposed within the passenger compartment so that the sensed acceleration is nearly identical to that experienced by the vehicle occupants. As will be appreciated by one of ordinary skill in the art, acceleration during a crash event is generally negative acceleration or deceleration. Depending on the particular orientation and type of sensor utilized, either a positive voltage or a negative voltage signal may be used to represent acceleration or deceleration for crash discrimination. In a preferred embodiment, sensor 12 generates a positive voltage signal as the passenger compartment decelerates.

Sensor 12 communicates with a controller 14 which monitors and periodically samples the signal generated by sensor 12. Controller 14 processes the sensor signal to determine when to generate a signal for deployment circuitry 16 to activate a passenger restraint, such as air bag 18.

Sensor 12 includes various components such as an accelerometer 20, an amplifier 22, a filter 24, and an analog to digital converter 26. Accelerometer 20 produces a signal which is amplified by amplifier 22, filtered and averaged to reduce high frequency noise by filter 24, and converted to a digital signal by analog to digital converter 26. The digital signal is provided to controller 14 via input ports 28.

Controller 14 preferably includes various computer readable media such as read only memory (ROM) 30, random access memory (RAM) 32, and keep alive memory (KAM) 34 for storing various data and instructions. The computer readable media communicate with input ports 28 and output ports 36 via a control and data bus 38. A microprocessor 40 executes control logic implemented by software or program instructions stored in at least one of the computer readable media to monitor the sensor signal and generate an appropriate signal for deployment circuitry 16 via output ports 36.

The computer readable media illustrated in FIG. 1 may be implemented by any of a variety of well known devices such as EPROM, EEPROM, flash memory or the like. Preferably, program instructions are stored in ROM 30. Various control parameters and thresholds used in determining whether to deploy air bag 18 may also be stored in ROM 30. RAM 32 may be used for various working calculations and other temporary storage of information. KAM 34 may be used to store acceleration data generated by sensor 12 over various time periods, as explained in greater detail with reference to FIGS. 2 and 3. Alternatively, RAM 32 may be used to implement one or more storage buffers, although this information would be lost upon resetting the controller. In contrast, values stored in KAM 34 are maintained without power being applied to the system.

Figure 4:
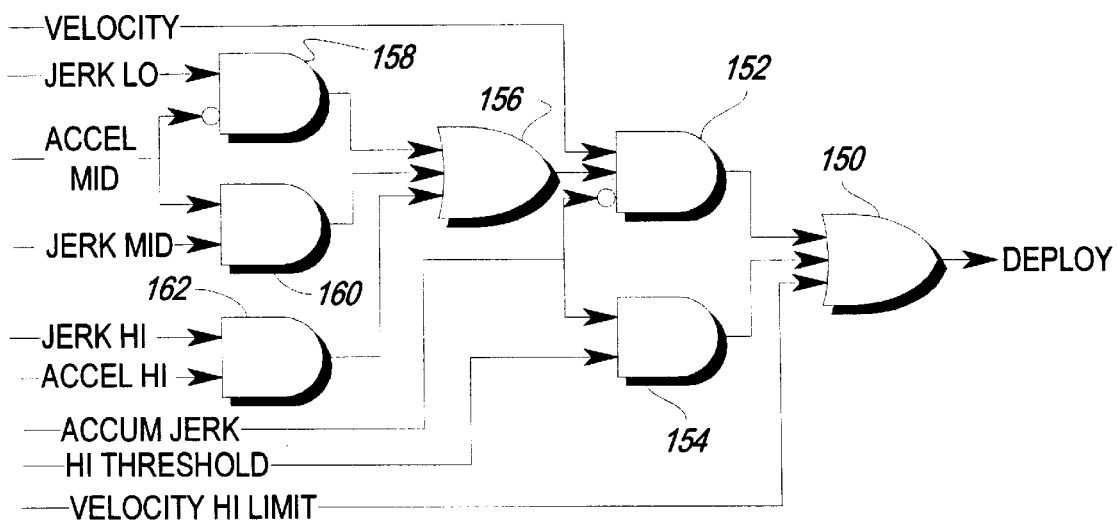
FIG. 4 is an alternative representation of control logic for generating a signal to deploy an inflatable restraint according to the present invention.
Figure 3:
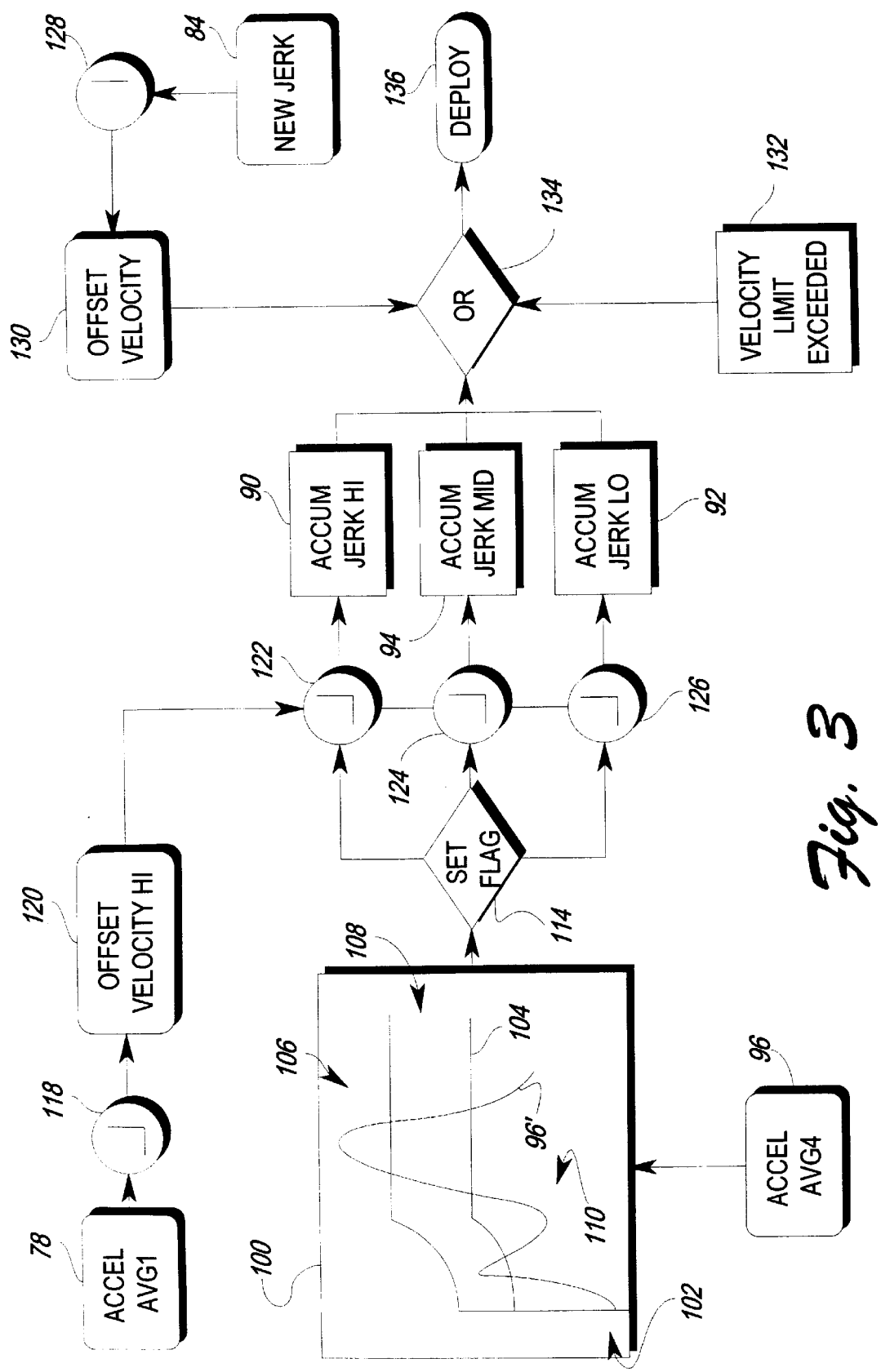

Referring now to FIGS. 2–4, flow diagrams illustrating operation of a system or method for controlling deployment of an inflatable restraint according to the present invention are shown. As will be appreciated by one of ordinary skill in the art, the flow diagrams represent control logic which may be implemented in hardware, software, or a combination of hardware and software. Preferably, control logic is stored in at least one computer readable medium, such as a PROM, EPROM, EEPROM, or flash memory, and represents program instructions which may be executed by a microprocessor. Of course, other implementations of the control logic using discrete components and/or custom integrated circuits, such as ASICs are possible without departing from the spirit or scope of the present invention. One of ordinary skill in the art will also recognize that the particular order or sequence illustrated is not necessarily required to achieve the goals and objects of the present invention. The order depicted in the figures has been chosen for ease of illustration and description only. As such, various programming and processing strategies may be used depending upon the requirements of the particular application.

Block 50 of FIG. 2 represents sampling of the signal produced by the sensor. The samples are filtered and clipped as represented by block 52. Preferably, the sensor values are limited to representations of 50 g for vehicle deceleration and 33 g for vehicle acceleration. The filtered samples represent the filtered acceleration data available for crash event discrimination and deployment decisions as represented by block 54. The filtered samples are stored in a number of ring buffers each having different lengths. In effect, the length of the each respective ring buffer performs a filtering function having a different frequency response.

Positive acceleration samples are stored in a positive acceleration buffer as represented by block 56. These samples are used to compute the average positive acceleration as indicated by block 58. The average acceleration is computed by summing the sample values and dividing by the buffer length.

The filtered acceleration samples are also used to compute the velocity of the passenger compartment as represented by block 60. The velocity is an approximation of the integral of the acceleration. The velocity is then used to determine the distance traveled by the passenger compartment as represented by block 62. The velocity is also adjusted by adding a constant to offset the velocity as indicated by block 64. This velocity with offset is used as a threshold modifier as explained in greater detail below.

The filtered acceleration samples generated by block 54 are stored in various ring buffers such as represented by block 66. The ring buffers are essentially first in, first out (FIFO) buffers of various lengths such that a predetermined number of previously received values are stored. Once the buffer is full, each subsequently received value eliminates the oldest value in the buffer. In one embodiment, buffer 3 includes a greater number of values than buffer 2 which has a greater number value then buffer 1. An offset is also applied to the instantaneous acceleration as represented by block 68 before being stored in buffer 2 and buffer 1 as represented by blocks 70 and 72, respectively. Average accelerations based on the values stored in the corresponding buffers are computed by blocks 74, 76, and 78.

Block 80 computes the negative jerk based on the samples stored in buffer 3. Alternatively, block 80 may represent determination of the jerk of the negative acceleration. Similarly, block 82 computes the positive jerk corresponding to the samples stored in buffer 3 or alternatively, block 82 determines the jerk of the positive acceleration. In effect, blocks 80 and 82 determine the length of the corresponding acceleration curve above and below the zero axis, respectively. The new jerk computed in block 84 represents a weighted sum of the positive and negative components of the jerk computed in blocks 80 and 82, respectively.

Blocks 86 and 88 compute the negative and positive jerk, respectively, corresponding to the samples stored in buffer 2. Similar to blocks 80 and 82, the negative jerk or the jerk of the negative acceleration produce similar performance as do the positive jerk and the jerk of the positive acceleration.

A fourth average acceleration is computed as represented by block 96. The fourth average acceleration is based on the average acceleration computed by block 78 adjusted by a constant scale factor multiplied by the average of the negative jerk as computed by block 80. The average acceleration computed by block 96 is compared to various distance-based thresholds as illustrated and described with reference to FIGS. 3 and 4.

The description of the control logic continues now with reference to FIG. 3. The fourth average acceleration as represented by block 96 is compared to distance thresholds as represented by block 100. A plot of the acceleration signal 96' is compared to the distance thresholds 102 to classify the event based on one of three possible crash severity zones 106, 108, and 110. An appropriate flag is set depending upon the particular threshold which has been exceeded as indicated by block 114.

The average acceleration based on the value stored in buffer 1 (as represented by block 78) is compared to a static threshold as represented by block 118. If the first average acceleration (computed based on buffer 1) exceeds threshold 118, then block 120 acts as a threshold modifier to increase the thresholds 122, 124, and 126. These thresholds are used for comparison against the accumulated jerk as indicated by blocks 90, 92, and 94 respectively. A deployment signal is generated as indicated by blocks 134 and 136 if any of the thresholds 122, 124, or 126 is exceeded by the corresponding accumulated jerk calculations which are preferably based on the acceleration data stored in the second buffer 70.

In one embodiment, the accumulated jerk for block 90 is calculated based on the positive jerk sum added to a scaled velocity with offset. This quantity is then multiplied by a constant scaling factor depending upon the particular application. Block 94 calculates accumulated jerk for the mid zone based on a scaling factor multiplied by the sum of the positive jerk, a scaled first average, and a scaled velocity with offset. The accumulated jerk calculated by block 92 is based on a scaling factor multiplied by the sum of the positive jerk, a scaled negative jerk, and a scaled velocity with offset.

Alternatively, a deployment decision may also be generated if new jerk 84 exceeds threshold 128 and velocity with offset 130 exceeds a corresponding velocity threshold. Similarly, if the velocity calculated by block 60 exceeds a high velocity limit, as represented by block 132, a deployment signal may be generated as represented by blocks 134 and 136.

To summarize, the present invention as illustrated in FIGS. 2 and 3 calculates a number of average accelerations to establish crash severity zones. For each zone, a combination of physical properties is calculated and compared to a physically based threshold, i.e. the distance traveled by the passenger compartment. As such, the present invention avoids strict use of elapsed time in the deployment decision.

Crash events which are classified in the high zone are characterized by a dominant velocity term with a smaller contribution from jerk. Events which occur in the mid zone are characterized by a dominant velocity and acceleration term with a smaller contribution from jerk. Low zone events exhibit a dominant jerk term with a relatively smaller velocity component. Event discrimination in each zone is accomplished by comparing weighted sums of the physical properties with the distance based thresholds. The velocity with offset is used as a threshold modifier to increase the distance-based thresholds in each zone. The jerk of negative acceleration (or negative jerk) is compared to a threshold and, if exceeded, the velocity with offset threshold is increased to provide improved side impact discrimination.

Referring now to FIG. 4, an alternative representation of control logic according to the present invention is illustrated. A signal is generated to actuate a passive restraint device when the conditions necessary for any one of the three inputs to block 150 are satisfied. As such, if the velocity exceeds a high velocity limit, a deploy signal is generated. Likewise, a deploy signal will be generated when the accumulated jerk exceeds a corresponding threshold and the threshold has been modified by the offset velocity as indicated by block 154. The conditions necessary to generate a deploy decision via block 152 include the velocity exceeding a second, lower threshold, the accumulated jerk being below its associated threshold, and any one of the input conditions to block 156 being satisfied.

To satisfy the input conditions for block 156, the fourth average acceleration calculation must be in the low zone and the jerk based on buffer 2 must exceed its corresponding threshold. Alternatively, the fourth average acceleration must be in the mid zone and the jerk based on the samples stored in buffer 2 must exceed its corresponding threshold. The third condition requires that the fourth average acceleration be in the high zone, and the jerk based on the samples in buffer 2 exceeds the high zone threshold as represented by block 162. The various zones are determined by the distance-based thresholds described and illustrated with reference to FIG. 3.

While the best mode for carrying out the invention has been described in detail, those familiar with the art to which this invention relates will recognize various alternative designs and embodiments for practicing the invention as defined by the following claims.

What is claimed is:

1. A method for controlling deployment of an inflatable restraint disposed within a passenger compartment of a vehicle, the method comprising:
   monitoring a signal indicative of acceleration of the passenger compartment to generate a plurality of signal samples;
   determining distance traveled by the passenger compartment based on the plurality of signal samples;
   determining a first, second, and third average acceleration of the passenger compartment based on a first, second, and third number, respectively, of the plurality of signal samples;
   determining jerk based on the first average acceleration;
   determining a fourth average acceleration based on a second number of the plurality of signal samples and the jerk of the second average acceleration;
   comparing the fourth average acceleration to a plurality of thresholds each based on the distance traveled; and
   generating a signal to deploy the inflatable restraint based on the jerk of the second average acceleration exceeding at least one of the plurality of thresholds.

2. The method of claim 1 further comprising:
   determining a velocity based on the plurality of signal samples;
   comparing the velocity to a first velocity threshold; and
   modifying at least one of the plurality of thresholds based on the velocity exceeding the velocity threshold, wherein the second average acceleration is compared to the modified threshold in generating the signal to deploy the restraint.

3. The method of claim 1 further comprising:
   determining a velocity based on the plurality of signal samples;
   comparing the velocity to a velocity limit threshold; and
   generating a signal to deploy the inflatable restraint based on the velocity exceeding the velocity limit threshold.

4. The method of claim 3 wherein the step of determining jerk includes determining jerk of negative acceleration based on the signal, the method further comprising:
   comparing the jerk of negative acceleration to a jerk threshold; and
   modifying the first velocity threshold based on the jerk of negative acceleration exceeding the jerk threshold.

5. The method of claim 1 wherein the step of determining jerk comprises:
   determining a positive jerk by calculating length of an acceleration curve above a threshold, the curve representing the second average acceleration;
   determining a negative jerk by calculating length of the acceleration curve below the threshold; and
   determining a cumulative jerk based on a weighted average of the positive jerk and the negative jerk.

6. A system for controlling deployment of an inflatable restraint disposed within a passenger compartment of a vehicle, the system comprising:
   a sensor for generating a signal indicative of acceleration of the passenger compartment; and
   control logic in communication with the sensor to periodically sample the signal to generate a plurality of signal samples, determine distance traveled by the passenger compartment based on the plurality of signal samples, determine a first, second, and third average acceleration of the passenger compartment based on a first, second, and third number of the plurality of signal samples, determine jerk based on the first average acceleration, determine a fourth average acceleration based on a second number of the plurality of signal samples and the jerk of the second average acceleration, compare the fourth average acceleration to a plurality of thresholds each based on the distance traveled, and generate a signal to deploy the inflatable restraint based on the jerk of the second average acceleration exceeding at least one of the plurality of thresholds.

7. The system of claim 6 further comprising:
   control logic for determining a velocity based on the plurality of signal samples;
   control logic for comparing the velocity to a first velocity threshold; and
   control logic for modifying at least one of the plurality of thresholds based on the velocity exceeding the velocity threshold, wherein the second average acceleration is compared to at least one modified threshold in generating the signal to deploy the restraint.

8. The system of claim 6 further comprising:

control logic for determining a velocity based on the plurality of signal samples;

control logic for comparing the velocity to a velocity limit threshold; and control logic for generating a signal to deploy the inflatable restraint based on the velocity exceeding the velocity limit threshold.

9. The system of claim 8 wherein the control logic determines jerk by determining jerk of negative acceleration based on the signal, the system further comprising:

control logic for comparing the jerk of negative acceleration to a jerk threshold; and control logic for modifying the first velocity threshold based on the jerk of positive acceleration exceeding the jerk threshold.

10. The system of claim 6 wherein the control logic determines jerk by:

determining a positive jerk by calculating length of an acceleration curve above a predetermined axis, the curve representing the second average acceleration;

determining a negative jerk by calculating length of the acceleration curve below the predetermined axis; and determining a cumulative jerk based on a weighted average of the positive jerk and the negative jerk.

\* \* \* \* \*